(12) United States Patent
Hukkanen

(10) Patent No.: US 6,270,564 B1
(45) Date of Patent: Aug. 7, 2001

(54) PROCESS FOR THE BLEACHING OF PIGMENTS

(75) Inventor: Pentti Hukkanen, Oulu (FI)

(73) Assignee: Kemira Chemicals Oy, Helsinki (FI)

( * ) Notice: Subject to any disclaimer, the term of this patent is extended or adjusted under 35 U.S.C. 154(b) by 0 days.

(21) Appl. No.: 09/256,112

(22) Filed: Feb. 24, 1999

(30) Foreign Application Priority Data

Feb. 24, 1998 (FI) .......................................... 980417

(51) Int. Cl.⁷ ................................ C09C 1/00; C09C 1/02; C09C 3/08
(52) U.S. Cl. ..................... 106/461; 106/416; 106/436; 106/447; 106/464; 106/465; 106/468; 106/469; 106/471
(58) Field of Search ...................................... 106/416, 436, 106/447, 461, 464, 465, 468, 469, 471

(56) References Cited

U.S. PATENT DOCUMENTS

| | | | |
|---|---|---|---|
| 3,589,922 | 6/1971 | Asdell et al. | 106/288 B |
| 4,935,391 | 6/1990 | Caropreso et al. | 501/146 |
| 5,188,814 | * 2/1993 | Hellstrom et al. | 423/430 |
| 5,342,443 | * 8/1994 | Forbus et al. | 106/488 |
| 5,397,754 | 3/1995 | Iannicelli et al. | 501/146 |

FOREIGN PATENT DOCUMENTS

| | | |
|---|---|---|
| AU-A-70277/96 | 4/1997 | (AU) . |
| DE 20 14 224 | 10/1970 | (DE) . |
| EP 0 291 271 | 11/1988 | (EP) . |
| 979972 | 3/1977 | (FI) . |
| GB 941480 | 11/1963 | (GB) . |
| 1 305 015 | 3/1969 | (GB) . |
| 55051717 | 4/1980 | (JP) . |
| WO 96/21062 | 7/1996 | (WO) . |

* cited by examiner

Primary Examiner—Mark L. Bell
Assistant Examiner—Michael J. DiVerdi
(74) Attorney, Agent, or Firm—Greenberg Traurig LLP; Joseph M. Manak

(57) ABSTRACT

The invention relates to a process for the bleaching of a mineral pigment or a synthetic pigment, in which process the pigment to be bleached is contacted with a solution which contains peracetic acid in order to obtain a pigment with a raised degree of brightness.

9 Claims, No Drawings

PROCESS FOR THE BLEACHING OF PIGMENTS

The invention relates to a process for the bleaching of mineral or synthetic pigments.

Pigments are prepared either from natural minerals or synthetically. Mineral pigments include kaolin, calcium carbonate, chalk, marble, talc, bentonite and natural gypsum. Synthetic pigments include synthetic gypsum, $TiO_2$ and precipitated calcium carbonate. In certain uses, for example in the coating of paper and as fillers, pigments are desired to have a maximal degree of brightness. For this purpose, there have been developed numerous processes intended for enhancing brightness.

Australian patent application AU-A-70277/96 discloses for kaolin a purification and bleaching process wherein oxidative ozone is used for bleaching kaolin from organic coloring impurities. U.S. Pat. No. 5,397,754 proposes as other oxidative agents oxygen and hydrogen peroxide, as well as sodium hypochlorite or lithium hypochlorite. According to U.S. Pat. No. 3,589,922, it is also possible to use potasium permanganate, zinc sulfate, oxalic acid, sodium dithionite and sulfur dioxide for the bleaching. From other publications there is also known the possibility of using chlorine, hydrazine and sodium silicate for the bleaching. It has been observed that the result of the bleaching of kaolin further improves if after an oxidative bleaching there is carried out a reducing bleaching, in which sodium dithionite, i.e. hydrosulfite, is commonly used. A process of this type is disclosed in U.S. Pat. No. 4,935,391.

Corresponding bleaching processes have also been disclosed for other pigments. In EP patent publication 291271, hydrogen peroxide is used on calcium carbonate, chalk and marble. The use of ozone for bleaching chalk has been known at least since 1970. In certain patent publications the use of ozone has been proposed for the bleaching of natural gypsum and synthetic gypsum. Ozone has proved to be an effective bleaching chemical, but it has the disadvantage of toxicity, which requires a high gas-tightness of the apparatus, and also a high price. Chlorine-containing bleaching agents also have their known disadvantages.

The bleaching result can be affected by means of temperature and pressure. For example, FI patent publication 97972 discloses a process for the bleaching of chalk by using hydrogen peroxide. It has been stated that this process works at a temperature of 95–150° C. When the operation takes place at temperatures this high, the bleaching must take place under pressure. Elevated pressure improves the bleaching effect but lowers the financial profitability.

Many pigments suitable for the coating of paper and for other uses involve the problem of a low degree of brightness. In many uses, brightness higher than at present would be desirable. For example, modern printed products are required to have as high a brightness as possible. State-of-the-art processes are not capable of bleaching pigments sufficiently, or the processes are too expensive. Thus there is a clear need in the art for a bleaching process by which the brightness of pigments could be increased and which would not have the prior art disadvantages.

It has now been observed, surprisingly, that a bleaching chemical, peracetic acid (PAA), used in chlorine-free bleaching of pulp works excellently even in small doses in the bleaching of pigments also. The observation is especially surprising, since by the use of peracetic acid a significant improvement of brightness was achieved also with pigments which did not contain any organic oxidizable components. Very high brightness values were achieved with peracetic acid, as shown by the results of the experiments described hereinafter.

Thus, according to the invention a process has been achieved for the bleaching of pigment, the process being characterized in that the pigment to be bleached is contacted with a solution which contains peracetic acid. The pigment to be bleached may be, for example, a mineral pigment such as kaolin, calcium carbonate, chalk, marble, talc, bentonite and natural gypsum, or a synthetic pigment such as synthetic gypsum, $TiO_2$ or precipitated calcium carbonate.

Peracetic acid is a chemical which forms when acetic acid and hydrogen peroxide react in the presence of a catalyst. There are various products commercially available, for example a 38-percent distilled peracetic acid (dPAA) and an equilibrium mixture of peracetic acid (ePAA). In spite of differences in composition, the various peracetic acid products are effective in the bleaching of pigments. The peracetic acid used for bleaching may also contain stabilizing agents. When reacting, peracetic acid releases nascent active oxygen, which is highly reactive. The acetic acid which is released upon the reaction of peracetic acid is also capable of binding cations when forming various acetate compounds.

The peracetic acid is preferably dosed into an aqueous slurry of the pigment, the slurry being stirred simultaneously. The dry matter content of the slurry is preferably approx. 30–80% by weight.

Typically the stirring time is 15 min, but it may vary. Stirring is important also for the reason that during stirring gaseous substances can escape from the slurry. At this stage the slurry may slightly froth or bubble. The dosing and stirring of peracetic acid may be carried out at room temperature or at an elevated temperature. Judging from the bleaching results, bleaching with peracetic acid works at low temperatures and does not require an elevated temperature. The bleaching result can be improved even considerably through the raising of the temperature. Also, the process does not require higher pressures, but an increasing of the pressure probably improves the bleaching result.

The dosing of peracetic acid for pigment is preferably approx. 0.05–5 kg/metric ton of dry pigment, indicated as a 100-percent peracetic acid. The most advantageous range is approx. 1–2 kg/metric ton. Peracetic acid works in bleaching within a very wide pH range. The peracetic acid addition lowers the pH value of the slurry to be bleached. In general it is not necessary to control the acidity of the slurry. In the experiments, good bleaching results were obtained when the pH value ranged from 2 to 12. If pigments which contain calcium carbonate are bleached, it is possible to compensate for the lowering of the pH by adding to the slurry being bleached substances which react in an alkaline manner.

On an industrial scale the bleaching may be carried out as a batch process or a continuous process.

It is preferable to carry out the bleaching on a material comminuted to the final fineness. Also coarser material, such as crude gypsum, can be bleached with good results (Example 2). In this case the achieved increase in brightness is retained at least in part also during the comminution of the material, as is seen from the results of Example 8.

After an oxidative bleaching carried out using peracetic acid, a reducing bleaching can be carried out using a reducing agent such as a dithionite, e.g. sodium dithionite.

The bleached pigment is in general used in slurry form, but it may, when necessary, be separated from the slurry by a procedure known per se, for example by filtration and possibly by drying.

The invention is described below in greater detail with the help of Examples 1–10. In the examples, the bleaching experiments were carried out on a pigment in slurry form. All of the experiments were carried out using the same procedure, and only the solids content of the slurry varied in some experiments.

Carrying out of the Experiments

In the experiments, a slurry was used which contained 667 g of pigment and 333 g of water, and possibly also chemicals required for the dispersing of the pigment particles. The slurry was poured into a vessel having a diameter of 120 mm and a height of 110 mm. There was placed in the vessel an anchor-like stirrer, which was rotated using a stirring motor at a rate of 200 revolutions/min.

The peracetic acid was added in the course of approx. one minute to the slurry being stirred, and the slurry was stirred thereafter for 15 minutes to reach homogeneity.

The peracetic acid began to be consumed immediately upon being added as it reacted with the compounds present in the pigment, at the same time releasing active oxygen. Some of the peracetic acid and its components reacted more slowly, and therefore the treated slurry was allowed to stand in a vessel with a cover until the following morning.

For determinations of brightness the slurry was weighed into crucibles made of aluminum foil. The slurries were dried in an incubator for 24 hours at +42° C. This treatment secured the retaining of the crystal water in materials, such as gypsum, which contained crystal water. The dried samples were ground in a Janke & Kunkel mill for 3 minutes. The dried sample was compressed into a briquette, from which the brightness was measured using a Zeiss Elrepho brightness meter at a wavelength of 457 nm in accordance with the standard SCAN-P 43:95. In each example, a reference experiment was carried out using a sample treated in a corresponding manner but to which no peracetic acid was added.

The aim of the experiments in Example 1 was to optimize the amount of peracetic acid required for bleaching. The preferred dose was selected on the basis of the results, and the further experiments were carried out using two doses, the lower being 1 kg/metric ton of dry pigment and the higher being 2 kg/metric ton. The unit of dosing used here and hereinafter is kg/metric ton, in which the kg amount stands for the amount of peracetic acid indicated as a 100-percent peracetic acid and the metric ton stands for one metric ton of dry pigment.

Since it was observed that the bleaching was effective even at room temperature and under normal pressure, the experiments were carried out in these conditions even though a better bleaching result is usually obtained using an elevated pressure and an elevated temperature, as was noted earlier.

In the experiments of Examples 1–5, a dPAA solution was used. In Examples 6 and 7, peracetic acid (dPAA), hydrogen peroxide and ozone were used as bleaching agents for gypsum. In Example 9, a two-step bleaching was carried out using peracetic acid (dPAA and ePAA) and sodium dithionite.

The principal components of the dPAA and ePAA solutions used in the examples were as follows (in percent by weight):

Composition of dPAA

38% peracetic acid

3% acetic acid

1% hydrogen peroxide approx. 58% water

Composition of ePAA

20% peracetic acid

25% acetic acid

15% hydrogen peroxide approx. 40% water

EXAMPLE 1

Gypsum pigments of different grades were bleached using peracetic acid. The gypsum pigments were commercial products which had been prepared from phosphogypsum ($CaSO_4 \cdot 2H_2O$) by grinding. Gypsum pigment 1 contained a large amount of fines. The weight proportion of particles which were smaller than 0.2 μm was approx. 20%. Gypsum pigment 2 contained a small amount of the above-mentioned fines, approx. 3%.

| Dose kg/t | Gypsum pigment 1 (Brightness %) | Gypsum pigment 2 (Brightness %) |
| --- | --- | --- |
| 0 (ref.) | 92.0 | 92.6 |
| 0.1 | 93.0 | 93.0 |
| 0.5 | 93.3 | 93.5 |
| 1.0 | 94.0 | 94.1 |
| 2.0 | 94.4 | 94.1 |
| 3.0 | 93.9 | 94.3 |

EXAMPLE 2

Crude gypsum and crude kaolin were bleached using peracetic acid. The crude kaolin was chemically untreated, cycloned and screened. The crude gypsum was phosphogypsum.

| Dose kg/t | Crude gypsum (Brightness %) | Graphite-containing crude kaolin (Brightness %) |
| --- | --- | --- |
| 0 (ref.) | 94.1 | 80.6 |
| 1.0 | — | 80.9 |
| 2.0 | 96.1 | 81.5 |
| 5.0 | 95.5 | — |

EXAMPLE 3

Kaolin pigments were bleached using peracetic acid. Kaolins 1, 2 and 3 were commercial pigment grades from different manufacturers.

| Dose kg/t | Kaolin 1 (Brightness %) | Kaolin 2 (Brightness %) | Kaolin 3 (Brightness %) |
| --- | --- | --- | --- |
| 0 (ref.) | 87.2 | 85.0 | 86.3 |
| 1.0 | 87.7 | 85.4 | 86.6 |
| 2.0 | 87.9 | 85.7 | 87.3 |

The results of the example showed that by the process according to the invention it was possible even to raise the degree of brightness of the commercial kaolin products which had undergone an oxidative bleaching process and a subsequent reducing bleaching.

EXAMPLE 4

Various calcium carbonates and talcs were bleached using peracetic acid. The precipitated calcium carbonate was of a low grade. Talc 1 was in slurry form, talc 2 was in powder form. Peracetic acid increased the brightness of all of these pigments, except that of the talc in powder form.

| Dose kg/t | Precipitated CaCO₃ (Brightness %) | Ground CaCO₃ (Brightness %) | Chalk (Brightness %) | Talc 1 (Brightness %) | Talc 2 (Brightness %) |
|---|---|---|---|---|---|
| 0 (ref.) | 90.7 | 94.1 | 82.0 | 85.7 | 87.8 |
| 1 | 91.4 | 94.3 | 83.2 | 86.0 | 87.2 |
| 2 | 91.6 | 94.6 | 83.6 | 86.2 | 86.9 |

EXAMPLE 5

Titanium dioxide and a commercial pearlescent pigment were bleached using peracetic acid. The pearlescent pigment was mica with titanium dioxide deposited on its surface.

| Dose kg/t | TiO₂ (Brightness %) | Pearlescent pigment (Brightness %) |
|---|---|---|
| 0 (ref.) | 94.4 | 78.5 |
| 1.0 | 95.0 | 78.8 |
| 2.0 | 95.0 | 80.6 |

EXAMPLE 6

Various bleaching agents were compared by bleaching a gypsum pigment using peracetic acid, hydrogen peroxide and ozone. The bleaching with ozone was carried out under a pressure of 3 bar. Clearly the best results were obtained with peracetic acid.

| Dose kg/t | dPAA (Brightness %) | H₂O₂ (Brightness %) | Ozone (Brightness %) |
|---|---|---|---|
| 0 (ref.) | 91.7 | 91.7 | 91.7 |
| 2 | 93.1 | 91.5 | — |
| 5 | 93.3 | 92.0 | 91.8*) |

*)Ozone dose = 6.3 kg/metric ton

EXAMPLE 7

Crude gypsum was bleached using peracetic acid, hydrogen peroxide and ozone. The ozone bleaching was carried out under a pressure of 3 bar. Only with considerably high ozone doses was the same degree of brightness achieved as with peracetic acid.

| Dose kg/t | dPAA (Brightness %) | H₂O₂ (Brightness %) | Ozone (Brightness %) |
|---|---|---|---|
| 0 (ref.) | 94.1 | 94.1 | 94.1 |
| 2.0 | 96.1 | 95.0 | — |
| 5.0 | 95.5 | 95.0 | — |
| 6.3 | — | — | 94.5 |
| 18.9 | — | — | 95.0 |
| 75 | — | — | 95.6 |

EXAMPLE 8

An untreated crude gypsum and a crude gypsum bleached with peracetic acid were ground to pigment fineness in a pilot mill. The measured degrees of brightness showed that the rise in the degree of brightness produced by the bleaching carried out on crude gypsum was retained throughout the grinding.

| Treatment | Crude gypsum (Brightness %) | Ground gypsum (Brightness %) |
|---|---|---|
| Untreated (ref.) | 94.2 | 90.4 |
| Bleached | 95.8 | 91.8 |

EXAMPLE 9

First an oxidative bleaching using peracetic acid (dose 2 kg/t) and thereafter a reducing bleaching using sodium dithionite (Na₂S₂O₄, dose 2 kg/t) were carried out on various gypsum and kaolin grades and on one talc grade. In the bleaching of talc grade 1, an ePAA solution was used, in the others, a dPAA solution was used. The results of the experiments showed that a reducing further bleaching after an oxidative bleaching usually raised the degree of brightness.

| Treatment | Gypsum grade 1 (Brightness %) | Gypsum grade 2 | Graphite-containing crude kaolin (Brightness %) | Kaolin 1 (Brightness %) | Kaolin 2 Brightness | Kaolin 3 (Brightness %) | Talc 2 (Brightness %) |
|---|---|---|---|---|---|---|---|
| Before bleaching | 92.0 | 91.6 | 80.6 | 87.2 | 85.0 | 86.3 | 87.8 |
| Oxidative bleaching | 95.0 | 93.6*) | 81.5 | 87.9 | 85.7 | 87.3 | 86.9 |
| Reducing bleaching | 96.7 | 93.0 | 82.8 | 88.3 | 86.0 | 87.9 | 89.0 |

*)dose 1 kg/t

EXAMPLE 10

Experiments in which gypsum was bleached using sodium dithionite alone and an experiment in which first a bleaching with peracetic acid and thereafter a bleaching with sodium dithionite were carried out. The result indicated that the reducing bleaching with sodium dithionite was not alone capable of raising the degree of brightness of the gypsum pigment unless bleachings using peracetic acid had been carried out before it.

| Gypsum | dPAA kg/t | $Na_2S_2O_4$ kg/t | Brightness % |
|---|---|---|---|
| Gypsum grade 2 | — | 2.0 | 90.7 |
| Gypsum grade 2 | 1.0 | 2.0 | 93.0 |

What is claimed is:

1. A process for the bleaching of a gypsum pigment, comprising the step of contacting a gypsum pigment to be bleached with a solution which contains peracetic acid.

2. The process according to claim 1, wherein the pigment to be bleached is slurried in water.

3. The process according to claim 2, wherein the slurry has a dry matter content of from about 30 to about 80 percent by weight.

4. The process according to claim 1, wherein the peracetic acid is present in an amount of from about 0.05 to about 5 kg/metric ton of dry pigment, indicated as a 100 percent peracetic acid.

5. The process according to claim 4, wherein the peracetic acid is present in an amount of from about 1 to about 2 kg/metric ton of dry pigment, indicated as a 100 percent peracetic acid.

6. The process according to claim 1, wherein the pigment to be bleached is comminuted to its final fineness before the bleaching.

7. The process of claim 1, wherein the bleaching of the gypsum pigment with a solution which contains peracetic acid is an oxidative bleaching and wherein after the oxidative bleaching, the bleached gypsum pigment is bleached with a reducing agent.

8. The process of claim 7, wherein the reducing agent is a dithionite.

9. The process of claim 8, wherein the dithionite is sodium dithionite.

* * * * *